United States Patent
O'Connell

(10) Patent No.: US 7,251,458 B2
(45) Date of Patent: Jul. 31, 2007

(54) SYSTEMS AND METHODS FOR RECYCLING OF CELL PHONES AT THE END OF LIFE

(75) Inventor: Donal O'Connell, Irving, TX (US)

(73) Assignee: Nokia Corporation, Espoo (FI)

( * ) Notice: Subject to any disclaimer, the term of this patent is extended or adjusted under 35 U.S.C. 154(b) by 295 days.

(21) Appl. No.: 10/444,485

(22) Filed: May 23, 2003

(65) Prior Publication Data

US 2004/0235513 A1 Nov. 25, 2004

(51) Int. Cl.
*H04B 1/38* (2006.01)

(52) U.S. Cl. .................. 455/90.1; 455/575.1; 455/418

(58) Field of Classification Search ............. 455/575.1, 455/419, 563, 90.1, 418, 575
See application file for complete search history.

(56) References Cited

U.S. PATENT DOCUMENTS

| | | | | |
|---|---|---|---|---|
| 5,365,570 | A * | 11/1994 | Boubelik | 455/565 |
| 5,875,393 | A * | 2/1999 | Altschul et al. | 455/407 |
| 5,946,613 | A * | 8/1999 | Hayes et al. | 455/406 |
| 5,966,654 | A | 10/1999 | Croughwell et al. | |
| 6,233,464 | B1 * | 5/2001 | Chmaytelli | 455/556.2 |
| 6,463,263 | B1 * | 10/2002 | Feilner et al. | 455/90.1 |
| 6,584,327 | B1 * | 6/2003 | Nilsson | 455/563 |
| 2002/0065868 | A1 | 5/2002 | Moore et al. | |
| 2002/0137476 | A1 * | 9/2002 | Shin | 455/90 |
| 2003/0087679 | A1 | 5/2003 | Naka et al. | |
| 2003/0134629 | A1 | 7/2003 | Jacobs et al. | |
| 2005/0009509 | A1 * | 1/2005 | Miscopein et al. | 455/418 |

FOREIGN PATENT DOCUMENTS

| | | |
|---|---|---|
| EP | 1 128 692 A | 8/2001 |
| GB | 2 378 854 A | 2/2003 |
| WO | WO 03/030381 A1 | 4/2003 |
| WO | 03/043303 * | 5/2003 |

OTHER PUBLICATIONS

International Search Report, EPO, mailed Oct. 14, 2004.
European Search Report, mailed Sep. 9, 2004.

* cited by examiner

*Primary Examiner*—Lester G. Kincaid
*Assistant Examiner*—Fred Casca
(74) *Attorney, Agent, or Firm*—Alston & Bird LLP

(57) ABSTRACT

The present invention provides systems and methods for transforming cell phones at end of life into new electronic devices, such as clocks, calculators, PDAs, remote controls, etc. Importantly, the systems and methods of the present invention salvage many of the features and electronics of the cell phone that are not associated with the placement and reception of telephone calls. The electronics of the cell phone are repackaged and/or configured to hide the telecommunications options associated with the phone, leaving intact or upgrading other features of the phone, such as clock, calculator, storage device, etc. In doing so, all or most of the components of the cell phone are successfully recycled over more conventional methods that scavenge the phones for precious metals and reusable components.

26 Claims, 4 Drawing Sheets

SYSTEMS AND METHODS FOR RECYCLING OF CELL PHONES AT THE END OF LIFE

BACKGROUND OF THE INVENTION

1. Field of the Invention

The present invention relates to conversion of used cell phones into new electronic devices that use features of the cell phone generally not related to placement and reception of telephone calls.

2. Description of Related Art

In the past few years, there have been several advancements in cell phone technology that are quickly rendering current cell phones in the market obsolete. Specifically, many new cell phone models are being developed or are currently on the market that integrate various other useful devices together with the more traditional features of cell phones. For example, features from personal digital assistants or PDAs are now being added to cell phones or vice versa to thereby provide a more integrated information source for the user. Further, cell phones now include features that allow a user to browse the Internet, send email, take pictures, play games, etc. These new features are highly desirable and many cell phones currently in use are and are expected to be replaced by this next generation of cell phones.

Disposal of obsolete cell phones is becoming a major concern for many cell phone manufacturers. In fact, there has been considerable time and effort spent to find ways of recycling and/or refurbishing of cell phones to prevent their wholesale disposal. For example, there are some companies that collect older cell phones, refurbish them, and then ship them to other countries for resale. Refurbishment typically involves only cosmetic changes to the phone, such as replacing the outer housing, keypad, and/or display of the phone such that the phone will be marketable in a selected area. In some instances, the refurbisher may replace some of the electronic components of the cell phone also. While refurbishment is a viable solution, there are issues associated with this industry. Specifically, many refurbishers are not associated with the cell phone manufacturers. As such, the cell phone manufacturer cannot ensure quality control with regard to the refurbishment. If the refurbished phones experience quality issues, these may be wrongly imparted by the customer to the cell phone manufacturer. Further, because there is little or no nexus between the cell phone manufacturer and the refurbisher, the refurbisher may inadvertently use replacement components that may be inferior or cause damage to the cell phone such as shorts or over heating.

There have also been efforts to recycle cell phones at end of life. Specifically, cell phones include some precious metals such as gold, silver, platinum, etc. in sufficient quantities to make recycling of these metals, as well as the plastic in the cell phone, worthwhile. However, the recycling costs typically outweigh the money received from the sale of these recycled products. Further, there are some portions of the cell phone that do not lend themselves to recycling. In addition to extraction of precious metals and plastics, there are various non-proprietary electronic components in cell phones that can be used in other electronic devices without modification, such as memory chips, general processors, etc. Here again, there are associated costs with recovery of the components and not all components can be recycled, especially those proprietary to the cell phone manufacturer. The largest concern with recycling is the battery packs, which have various environmental issues related to their disposal.

In light of the above, it is readily apparent that new procedures and methods are needed for recycling of cell phones. In particular, procedures methods are needed that are cost effective, while at the same time make use of as many components of the cell phone as possible.

BRIEF SUMMARY OF THE INVENTION

The present invention provides various systems and methods that overcome many of the issues relating to current recycling efforts of cell phones. Specifically, the systems and methods of the present invention realize that many of the features of today's cell phones are not related to the placement and reception of telephone calls functions of the phone, but are more closely related to conveniences for the user. These various functions, by themselves, can be used to create an electronic device that would be desirable irrespective the telecommunication features.

For example, many of today's cell phones include features such as clocks, calculators, stopwatches, calendars, telephone number storage, game features, cameras, picture storage, radios, etc. that are not directly related to the placement and reception of telephone calls. In view of these advantageous features, the systems and methods of the present invention recycles cell phones at their end of life by transforming them into other devices that use the non-telecommunication aspects of the cell phone, such as alarm clocks, calculators, games devices, etc. and reselling the transformed units. Further, in some instances the systems and methods of the present invention may add or rewrite software to add additional features to the phones during transformation.

For example, in one embodiment of the present invention, the systems and methods alter the housing and/or keypad of the cell phone to thereby hide telecommunications features of the phone. For example, a new cover may be designed to hide certain keys, such as the "send" key from view, while other designs may replace the keypad altogether to remove phone related keys. Once recycled, the former cell phone can be sold as a PDA or similar device that includes existing features of the cell phone, such as a clock, calculator, games, storage device etc.

In some embodiments, the systems and methods of the present invention provide a more pronounced transformation of the phone. In these embodiments, the cover and keypad are initially removed from the phone, leaving only the internal electronics. The cover is then reformed into a desirable shape, such as an alarm clock, calculator, game device, PDA, etc. The electronics are then replaced. The desired feature(s) of the phone is then used in the new device, (e.g., the clock, calculator, calendar, games, data storage functions).

In some embodiments, the systems and methods of the present invention may add additional programming to create new features for the recycled device. For example, in the instance where the phone is transformed to a clock, additional features, such as snooze functions, may be added to the software. Further, additional hardware features may also be added to the transformed systems.

Although not required, many of the transformed designs will continue to use the same battery packs and chargers as were used in the telephone. This advantageously "recycles" these components, which might otherwise be discarded.

These and other aspects of the present invention are described in greater detail below.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As mentioned above and detailed further below, the present invention provides systems and methods that transform cell phones at end of life into new electronic devices, such as clocks, calculators, game devices, PDAs, remote controls, etc. Importantly, the systems and methods of the present invention salvage many of the features and electronics of the cell phone that are not associated with the placement and reception of telephone calls. The electronics of the cell phone are repackaged and/or configured to hide the telecommunications options associated with the phone, leaving intact or upgrading other features of the phone, such as clock, calculator, games, storage device, etc. In doing so, all or most of the components of the cell phone are successfully recycled over more conventional methods that scavenge the phones for precious metals and reusable components.

An important aspect of the claimed invention is that the cell phone is transformed from something having a short life span to a device with an undeterminable life span. Specifically, cell phones typically have a short life span due to new developments in the technology that may render the phones obsolete within a few years. The systems and methods of the present invention advantageously transform the cell phones into clocks, calculators, game devices, PDAs etc. that do not experience the same level of turn over as is experienced in cell phones. This, in turn, means that the recycled electronics, plastics, etc. of the cell phone may remain in use for several years after their usefulness as a cell phone has ended. Further, the electronics and packaging components of a cell phone are typically of a higher grade than corresponding components found in many clocks, calculators, game devices, etc. As such, the systems and methods of the present invention may provide higher quality recycled devices from the cell phones.

Figure 1:
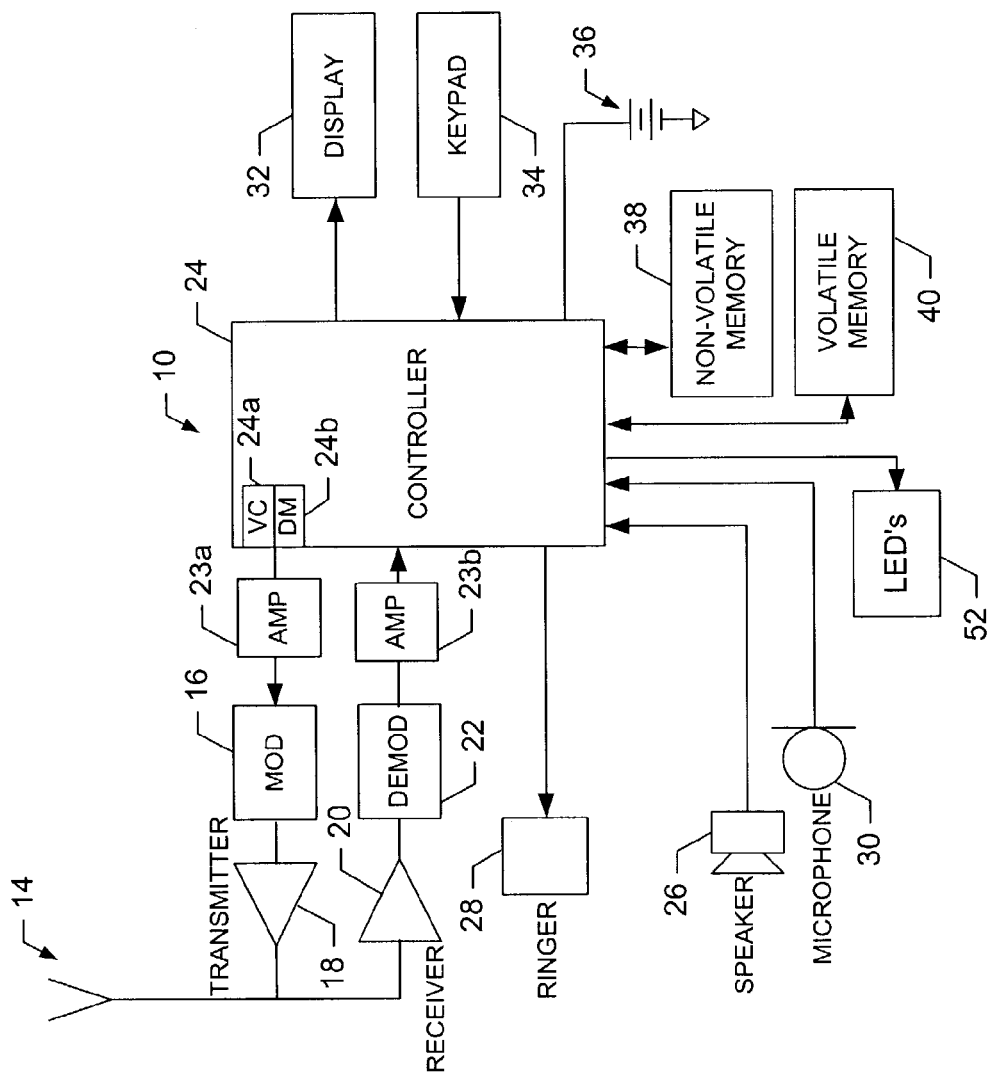
FIG. 1 is a block diagram of a typical cell phone that could be used in conjunction with the present invention.
Figure 2:
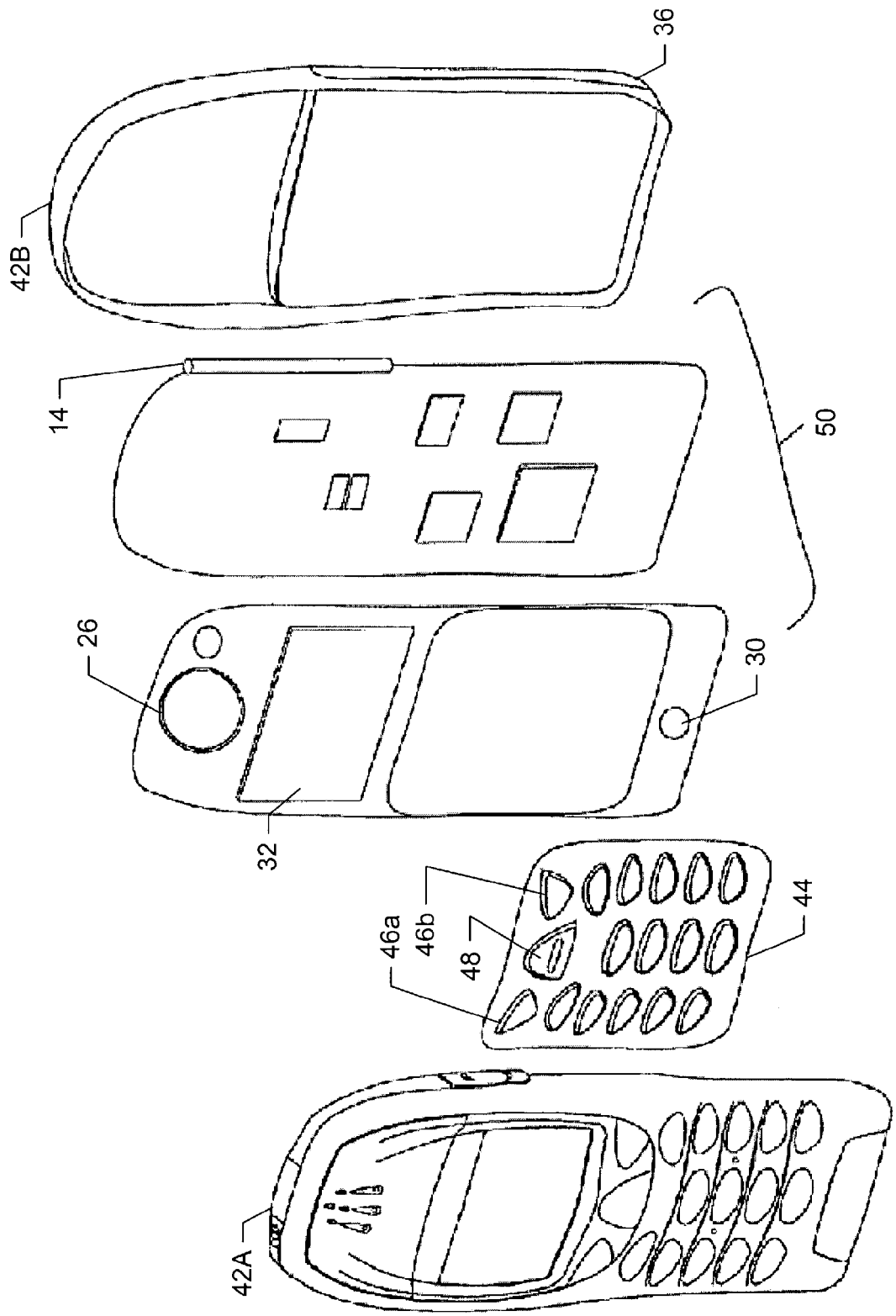
FIG. 2 is a schematic diagram of the cell phone depicted in FIG. 1.

FIGS. 1 and 2 illustrate the major components found in most cellular phones. Specifically, a cell phone 10 includes a communication section 12 for receiving and transmitting signals. The communication section includes an antenna 14 for transmitting signals to and for receiving signals from a base site or base station (BS). Further, the communication section 12 includes a modulator (MOD) 16, a transmitter 18, a receiver 20, and a demodulator (DEMOD) 22. Located between the transmitter and modulator and the receiver and demodulator are typically respective amplifiers, 23a and 23b, for amplifying signals transmitted from and received by the cell phone. A controller 24 is connected to the communication section 12 and provides signals to and receives signals from the transmitter and receiver, respectively. These signals include signaling information in accordance with the communications standard of the applicable cellular system, and also user speech and/or user generated data.

In addition to interfacing with the communication section 12, the controller 24 also includes the circuitry required for implementing the audio and logic functions of the phone. By example, the controller may be comprised of a digital signal processor device, a microprocessor device, and various analog to digital converters, digital to analog converters, and other support circuits. The controller can additionally include an internal voice coder (VC) 24A, and may include an internal data modem (DM) 24B.

The telephone also includes a user interface such as a conventional earphone or speaker 26, a ringer 28, a conventional microphone 30, a display 32, and a user input keypad 34, all of which are coupled to the controller 24. The phone also includes a battery 36 for powering the various circuits that are required to operate the phone.

To store data upon receipt from the various sources, the mobile station includes volatile memory 38, such as volatile Random Access Memory (RAM) including a cache area for the temporary storage of data. The mobile station can also include non-volatile memory 40, which can be embedded and/or may be removable such as a removable Subscriber Identification Module (SIM). The non-volatile memory can additionally or alternatively comprise an EEPROM, flash memory or the like. The memories can store any of a number of pieces of information, and data, used by the mobile station to implement the functions of the mobile station.

With reference to FIG. 2, the electronics of the cell phone are housed in a housing 42 including a front 42a and a back 42b cover. The front and back covers can be made from any of a number of different materials, including but not limited to plastic. In one embodiment, however, the covers are made from an at least partially transparent material such that light emitted from light emitting elements encapsulated within the cover is capable of propagating at least partially through the covers.

The phone 10 also generally includes a user input membrane, such as a keypad membrane 44, that is in contact with the keypad 34, by which the user may input data into the phone. The keypad includes the conventional numeric (0-9) and related keys (#, *), and other keys used for operating the cell phone. Further, the keypad may include soft keys, 46a and 46b, for accessing functions listed on the display and a scroll key 48 for scrolling through menus on the display. Further, the keypad may include other keys, such as for example, a SEND key and a power PWR key. The keypad membrane 44 is located typically on a flexible substrate 50 that contains the display 32, the microphone 30, the speaker 26, and ringer 28. The flexible substrate may also include a plurality of light emitting diodes (LEDs).

The cell phone 10 can also be provided with an infrared transceiver (not shown) or other means of local data transfer so that data can be shared with other devices such as other mobile stations, car guidance systems, personal computers, printers and the like. The local sharing of data, as well as the remote sharing of data, can also be provided according to a number of different communication techniques.

Many of today's cell phones include a plurality of functions, some of which are associated with the placement and reception of phone calls and some of which are for more general use. Specifically, cell phones include software operated on by the controller 24 to initiate and receive telephone calls, retrieve phone messages, store caller IDs, etc. related to telecommunications. Further, cell phones include various other features such as telephone number storage and retrieval, email access, web access, clocks, stop watches, alarms, tone selection and control, calendars, calculators, games, cameras, radio, etc. Many of these features present in a typical cell phone have advantageous uses outside of the telecommunications aspect of the phone, and can be used in new device configurations at the end of life of the cell phone.

As an example, a cell phone can be easily converted to an alarm clock having features that are above and beyond what is offered on many typical alarm clocks. For example, in a first embodiment of the present invention, at a minimum, the communication electronics 12 of the cell phone can be disabled. This can be done either via software and/or by manipulation of the circuit. For example, the amplifiers, 23a and 23b, associated with the communication electronics could be removed or disabled. This, in effect, disables the phone's ability to receive or place phone calls. Further, the software operated by the controller 24 could be reprogrammed to remove some or all of the other features of the phone, except for the clock feature, alarm feature, tone control and selection, and lighting, thereby transforming the cell phone into a functional clock having tone control and selection features. In this simplest embodiment, the cell phone would include its standard outer cover 42 and for all purposes resemble a cell phone, but the cell phone itself would now only function as a clock.

It is understood that the above disclosure is just one example of the many different devices that a typical cell phone could be converted into at end of life using the existing features of the cell phone. For example, the cell phone could be converted into a calculator in a similar manner as disclosed above. Further, as mentioned some cell phones now have built in cameras. These cell phones could be converted into cameras, where the pictures are stored in the memory of the phone. The IR port on the phone and/or other data communication ports located on most phones could be used to transmit the pictures to a personal computer for storage and printing.

Similarly, the cell phone could be converted into a PDA. In this embodiment, the telephone number storage and calendar features could be left in tact, thereby allowing the user to store telephone numbers and use the calendar functions similar to a conventional PDA. Further additional features found in most PDAs could be added by reprogramming the software or adding additional components to the device, such as a stylus and a touch screen. Similarly, the cell phone could be converted into a calculator or game device.

As mentioned, some cell phones now include Internet browsers, email, and some even include built-in radios. In these embodiments, the communication electronics 12 would not be disabled, but would instead be used for wireless communication of Internet, email, and radio data. In these embodiments, the software related to telephone service would be disabled so that the phone no longer receives and initiates telephone calls. However, the software related to the Internet, email, and radio functions would be maintained in the recycled device.

In short, a cell phone could be converted into a wide variety of devices by merely disabling those features that are associated with telecommunications and maintaining either all or some of the already embedded features of the phone. Importantly, these recycled devices may use the same housing, electronics, battery pack, etc. that were used when the device was operated as a cell phone, thereby achieving a near 100% recycling of the cell phone.

In the above-described embodiments, recycling is accomplished by merely disabling unwanted features of the cell phone when it is converted into a new recycled device. It is also contemplated, however, that additional features can be added to the device during the recycling process. These features could be in the form of either hardware or software. For example, as illustrated in FIG. 1, many cell phones include a general purpose central controller 24 and general purpose memory 38 and 40. New software features can be easily added to a recycled device by merely adding or altering the software operated on by the controller. For example, if the phone is converted into an alarm clock, additional features could be added such as snooze functions and/or stopwatch functions, (if these were not already features of the cell phone), to thereby increase the functionality of the recycled device. As another example, if the cell phone is converted into a PDA, additional functionality such as an address book could be added to the recycled device.

In the above disclosed embodiments, the housing, keypad, and other physical features of the cell phone remain in tact. In other words, for the most part, the recycled device closely resembles a cell phone. However, the functions related to placement and reception of telephone calls have typically been disabled from the recycled device, and the remaining features either used in their current configuration or updated for new uses. These embodiments are typically the easiest forms of recycling, as little to no re-engineering is required. However, because these embodiments retain the look and feel of a cell phone, they may be less marketable to consumers. For this reason, the present invention also includes embodiments in which the cover, keypad, and other external features of the cell phone may be redesigned to provide a more stylized device.

In particular, a main goal of these stylized embodiments is to create outer housings that will accommodate the existing displays 32, keypads 34, speakers 26, battery pack 36, etc. of the cell phone, thereby insuring that all or as many components as possible are reused in the recycled device.

Figure 3A:
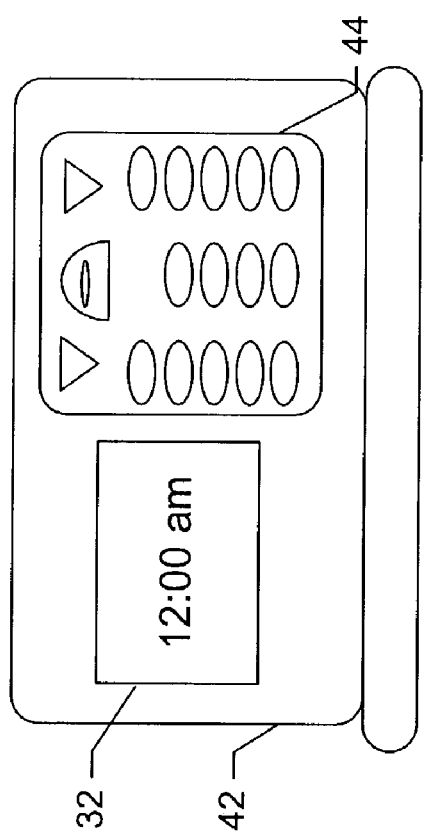
FIGS. 3A and 3B are respective front and back views of a clock that was constructed using cell phone components according to one embodiment of the present invention.
Figure 3B:
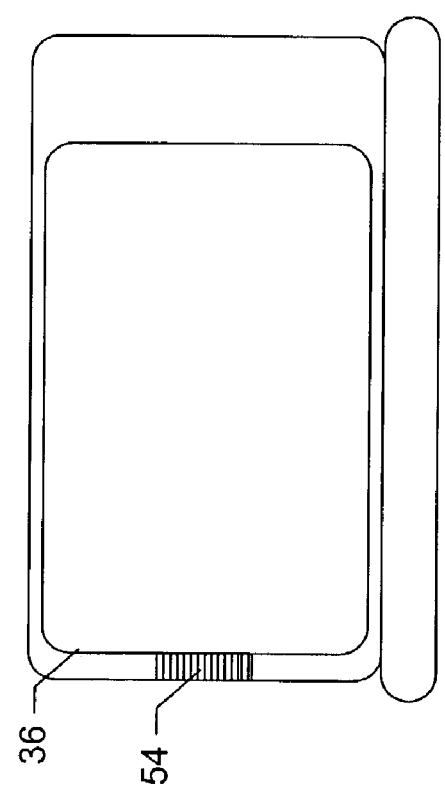

For example, FIGS. 3A and 3B illustrates an alarm clock that has been created by recycling a typical cell phone. As demonstrated, the outer housing 42 of the cell phone has been removed and reprocessed into a different shape using known plastics reprocessing techniques. (Alternatively, the housing of the cell phone may have been recycled and a separate newly designed housing used.). In this embodiment, the housing has been formed to accommodate the existing display 32 of the cell phone in a side by side relationship with the existing keypad 34. This arrangement reconfigures the cell phone to resemble a customary design used for many alarm clocks. In this embodiment, the electronics of the cell phone are somewhat reconfigured to place the display and keypad in this configuration. For example, extended connectors may be used to provide for the new configuration. Further, the keypad membrane is likely replaced by a keypad membrane suitable for clock functions and the keypad may be reconfigured to accept appropriate commands from the keypad membrane.

As illustrated in FIG. 3B, the battery pack 36 of the cell phone may be located on the back, sides, or bottom of the cover, with the associated connector 54 for supplying power to the battery pack. While a hardwire connection could be used in place of the battery pack, given the recycling goals of the present invention, the battery pack is typically used so that the battery pack is not discarded during the recycling process. Further, the battery pack also renders the clock portable.

Figure 4A:
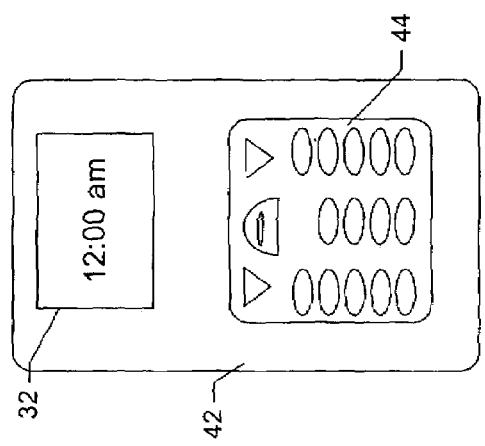
FIGS. 4A and 4B are respective front and back views of a calculator, game device, or other PDA that was constructed using cell phone components according to one embodiment of the present invention.
Figure 4B:
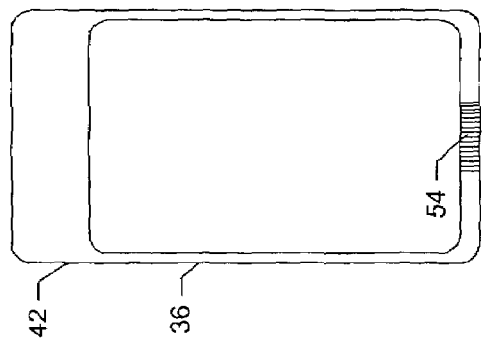

In a like manner, FIGS. 4A and 4B illustrate a cell phone that has been reconfigured into a calculator, game device, and/or PDA. As illustrated in this embodiment, the display and keypad remain in a top-bottom configuration similar to the arrangement in a cell phone, and the battery pack remains in a position on the backside of the housing. However, in this particular embodiment, the housing may be reconfigured to provide a different form fit to the user's hand from that of the cell phone configuration, since the new device will be used as a data entry device and not as a phone.

FIGS. 3A-3B and 4A-4B are only examples of the different configurations that might be designed for rehousing of the electronics of a cell phone into a new form for use of the cell phone as a recycled device. It must be understood that various other designs are contemplated herein. The selected design for a given recycled device will be dictated by the desired functions of the device and to some extent the designs used for similar devices in the market. In short, the present inventions envisions any system that incorporates the components of a cell phone into a new design such that the features of the cell phone can be used irrespective of the telecommunications aspects of the phone.

In the embodiments illustrated thus far, the central theme has been the repackaging and/or reconfiguration of the cell phone to take advantage of the existing features of the cell phone. However, the present invention also recognizes that most cell phones use general controllers, memory, and displays that can be reconfigured for many uses merely by changing the software that operates these devices. Specifically, with a change in programming, the components of a cell phone can be recycled into any type of device that requires a display, keypad, processor, memory, and optionally, communication electronics.

As an example, a cell phone could be easily transformed into a remote control using either an IR port associated with the phone or the existing communications electronics. In this embodiment, the software of the cell phone would be reprogrammed, such that the controller 24 accepts commands entered from the keypad, formats, and then transmits these commands via IR or RF to a base station, such as a TV or other electronics device.

There are some important advantages associated with conversion of the cell phone to a remote control. First, most cell phones are shaped similar to many existing remote control designs and are configured to conform to a user grip. As such, it may be possible to use the existing housing of the cell phone for the remote. Further, the processor of a cell phone is typically more advanced than a typical remote control, and the cell phone includes an existing display not found on many conventional remote control devices. As such, various software and display features may be incorporated into the recycled remote control to provide added and upgraded features from those of a conventional remote control.

Many of the embodiments disclosed thus far either use or attempt to use all components of a cell phone in a recycled device. These embodiments are advantageous as they reduce the number of components from the cell phone that must be scrapped during recycling. Despite this overlying goal, it is understood that this is not possible for all applications of the invention. The present invention thus contemplates embodiments where only a subset of the components of the phone is incorporated into a new device. For example, embodiments are contemplated in which the electronics are removed from the cell phone, reconfigured and reprogrammed for other uses. These new devices may or may not include the display, keypad, battery pack, cover, etc. of the cell phone depending on the application. Importantly, despite the components used and not used, these embodiments will provide more cost effective use of the cell phone components over more conventional methods of recycling where the components are either processed for their precious metal content or sold piecemeal for other uses.

The systems and methods of the present invention provide advantageous methods for the recycling of cell phones. These systems and methods also provide new markets for these recycled devices. Specifically, it is contemplated that various methods will be used to collect cell phones at end of life. These methods may include:
  1) mail in collection programs;
  2) collection bins located at retail or cellular shops;
  3) collection bins located at service centers;
  4) rebate programs encouraging users to upgrade to a new phone;
  5) partnerships with carriers and logistic companies to offer incentives for users to mail in their old phones
  6) etc.

Once the cell phones have been recycled into new devices, these recycled devices can be distributed in various ways. For example, they may be sold as retail items, or given as incentive prizes or promotional gifts, donated to needy organizations, etc.

In general, the systems and methods of the present invention are not meant to wholly supplant other cell phone recycling efforts such as recycling pressure metals, non-proprietary component parts, and refurbishment. They systems and methods are, however, meant to be used as alternative to these current methods. It is envisioned that a company may refurbish some returned phones for resale, reconfigure some phones based on the systems and methods of the present invention, and recycle precious metals and non-proprietary components from some cell phones as their needs dictate.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for recycling cell phones having a plurality of features some of which are related to placement and reception of phone calls, said method comprising:

receiving a cell phone after a period of use for purposes of recycling the cell phone;

wherein the cell phone was used for placement and reception of phone calls;

disassembling the cell phone components including receiving and transmitting components;

altering the operation of the communication section of the cell phone so that the cell phone is no longer used for placement and reception of phone calls; and reassembling the cell phone with the communication section disabled, so that the cell phone when recycled is used only for features of the cell phone not related to placement and reception of telephone calls.

2. A method according to claim 1 further comprising disabling of the features of the cell phone that are related to placement and reception of phone calls.

3. A method according to claim 1, wherein said altering comprises disabling a transmitter and a receiver circuit of the cell phone.

4. A method according to claim 1, wherein said cell phone includes a keypad and key membrane for receiving input from a user, and wherein said method further comprises replacement of the key membrane of the cell phone with a key membrane that hides features of the cell phone related to placement and reception of phone calls.

5. A method according to claim 1, wherein the cell phone includes features related to clock functions in addition to features related to placement and reception of telephone calls, wherein said altering disables the features related to placement and reception of phone calls to thereby transform the cell phone into a clock.

6. A method according to claim 1, wherein the cell phone includes features related to calculator functions in addition to features related to placement and reception of telephone calls, wherein said altering disables the features related to placement and reception of phone calls to thereby transform the cell phone into a calculator.

7. A method according to claim 1, wherein the cell phone includes features related to a personal digital assistant in addition to features related to placement and reception of telephone calls, wherein said altering disables the features related to placement and reception of phone calls to thereby transform the cell phone into a personal digital assistant.

8. A method according to claim 1, wherein the cell phone includes features related to games in addition to features related to placement and reception of telephone calls, wherein said altering disables the features related to placement and reception of phone calls to thereby transform the cell phone into a game device.

9. A method according to claim 1, wherein said cell phone comprises a controller and software operated by the controller to implement features of the cell phone, wherein said method further comprises reprogramming the software to remove unwanted features from the cell phone.

10. A method according to claim 1, wherein said cell phone comprises a controller and software operated by the controller to implement features of the cell phone, wherein said method further comprises reprogramming the software to add additional features to the cell phone.

11. A method according to claim 1, wherein said cell phone includes a transmitter and a receiver circuit and features related to placement and reception of telephone calls, wherein said altering disables features of the cell phone that are related to placement and reception of phone calls while leaving the transmitter and receiver circuits in tact for use in other forms of wireless communication.

12. A method according to claim 1, wherein said cell phone includes an outer housing, said method further comprising replacing the housing with a new housing.

13. A method according to claim 1, wherein said cell phone includes an outer housing, said method further comprising reshaping the housing into a desired shape.

14. A method according to claim 1, wherein said cell phone includes an outer housing, said method further comprising replacing the housing with a new housing that hides features of the cell phone related to placement and reception of phone calls.

15. A method for recycling a cell phone comprising:
providing a cell phone having features related to placement and reception of phone calls and features related to at least one other function of the cell phone;
receiving a cell phone after a period of use for purposes of recycling the cell phone;
wherein the cell phone was used for placement and reception of phone calls;
disassembling the cell phone components including receiving and transmitting components;
altering the features of the cell phone related to placement and reception of phone calls, so that the cell phone when recycled is no longer used for placement and reception of phone call; and
reassembling the cell phone with the communication section disabled, so that the cell phone is used only for features of the cell phone not related to placement and reception of telephone calls, thereby providing a recycled device including features related to at least one other function of the cell phone.

16. A method according to claim 15, wherein altering comprises disabling a transmitter and a receiver circuit of the cell phone.

17. A method according to claim 15, wherein the features related to at least one other function of the cell phone are features related to clock functions.

18. A method according to claim 15, wherein the features related to at least one other function of the cell phone are features related to calculator functions.

19. A method according to claim 15, wherein the features related to at least one other function of the cell phone are features related to a personal digital assistant.

20. A method according to claim 15, wherein the features related to at least one other function of the cell phone are features related to a games.

21. A method according to claim 15, wherein the cell phone further comprises a controller and software operated by the controller to implement features of the cell phone, wherein said method further comprises reprogramming the software to remove unwanted features from the cell phone.

22. A method according to claim 15, wherein the cell phone comprises a controller and software operated by the controller to implement features of the cell phone, wherein said method further comprises reprogramming the software to add additional features to the cell phone.

23. A method according to claim 15, wherein the cell phone includes a transmitter and a receiver circuit and features related to placement and reception of telephone calls, wherein said altering disables features of the cell phone that are related to placement and reception of phone calls while leaving the transmitter and receiver circuits in tact for use in other forms of wireless communication.

24. A method according to claim 15, wherein said cell phone includes an outer housing, said method further comprising replacing the housing with a new housing.

25. A method according to claim 15, wherein said cell phone includes an outer housing, said method further comprising reshaping the housing into a desired shape.

26. A method according to claim 15, wherein said cell phone includes an outer housing, said method further comprising replacing the housing with a new housing that hides features of the cell phone related to placement and reception of phone calls.

* * * * *